US008826617B2

United States Patent
Endo

(10) Patent No.: US 8,826,617 B2
(45) Date of Patent: Sep. 9, 2014

(54) RESIN PANEL AND METHOD OF PRODUCING THE SAME

(75) Inventor: Haruhiro Endo, Chiba (JP)

(73) Assignee: Kyoraku Co., Ltd., Tokyo (JP)

(*) Notice: Subject to any disclaimer, the term of this patent is extended or adjusted under 35 U.S.C. 154(b) by 532 days.

(21) Appl. No.: 11/915,584

(22) PCT Filed: May 31, 2006

(86) PCT No.: PCT/JP2006/310926
§ 371 (c)(1),
(2), (4) Date: Nov. 27, 2007

(87) PCT Pub. No.: WO2006/129730
PCT Pub. Date: Dec. 7, 2006

(65) Prior Publication Data
US 2009/0029083 A1    Jan. 29, 2009

(30) Foreign Application Priority Data
May 31, 2005    (JP) .................. 2005-158949

(51) Int. Cl.
  *E04C 1/00*   (2006.01)
  *E04C 2/22*   (2006.01)
  *E04C 2/296*  (2006.01)
  *E04C 2/20*   (2006.01)
  *B29C 49/20*  (2006.01)
  *B29C 49/00*  (2006.01)
  *B29C 49/04*  (2006.01)
  *B29K 105/04* (2006.01)

(52) U.S. Cl.
  CPC ......... *B29C 49/20* (2013.01); *B29C 2049/2008* (2013.01); *B29C 49/0047* (2013.01); *E04C 2/22* (2013.01); *E04C 2/296* (2013.01); *B29C 49/04* (2013.01); *E04C 2/20* (2013.01); *B29K 2105/04* (2013.01)
  USPC ..... 52/309.7; 52/309.4; 52/309.16; 428/36.5; 428/71

(58) Field of Classification Search
  USPC .......... 52/309.4, 309.2, 309.16, 309.7, 309.9, 52/794.1; 428/36.5, 71, 304.4; 156/228, 156/245, 292, 293, 309.9
  See application file for complete search history.

(56) References Cited

U.S. PATENT DOCUMENTS 3,088,166 A * 5/1963 Colombo ................ 264/514
3,484,331 A * 12/1969 Betz ...................... 428/119
(Continued)

FOREIGN PATENT DOCUMENTS

| JP | 60-260316 | 12/1985 |
| JP | 10-080982 | 3/1998 |
| JP | 2000-218682 | 8/2000 |

OTHER PUBLICATIONS

PCT Search Report dated Aug. 22, 2006 of Patent Application No. PCT/JP2006/310926 filed May 31, 2006.

*Primary Examiner* — Joshua J Michener
*Assistant Examiner* — Matthew Gitlin
(74) *Attorney, Agent, or Firm* — Maine Cernota & Rardin

(57) ABSTRACT

Provided is a resin panel produced such that the positioning of a reinforcing material can be precisely done, rattling movement is prevented and distortion by molding shrinkage is not caused because the reinforcing materials are maintained in the foam.

A resin panel is a hollow double-wall structure including a front wall, a back wall and a peripheral wall joining the front wall and back wall together. The peripheral wall of the resin panel has a welded part on its entire periphery. Within a hollow part is inner packed a foam made of a thermoplastic resin that is formed in advance in the substantially the same shape as the shape of the space within the hollow part. The foam is welded on the inner wall faces of the front wall and back wall of the resin panel. In the foam are formed accommodation parts for accommodating reinforcing materials. The reinforcing materials are lengthwise. The foam intervenes between the ends of both of the reinforcing materials and the peripheral wall.

5 Claims, 2 Drawing Sheets

(56) References Cited

U.S. PATENT DOCUMENTS

| | | | | |
|---|---|---|---|---|
| 3,627,622 A * | 12/1971 | Vega | | 428/308.4 |
| 3,671,355 A * | 6/1972 | Paymal | | 156/324 |
| 3,726,951 A * | 4/1973 | Smith et al. | | 264/46.2 |
| 3,766,699 A * | 10/1973 | Dinkel | | 52/591.4 |
| 3,791,912 A * | 2/1974 | Allard | | 428/159 |
| 3,810,337 A * | 5/1974 | Pollard | | 52/223.8 |
| 3,940,528 A * | 2/1976 | Roberts | | 428/161 |
| 3,960,999 A * | 6/1976 | Massie | | 264/45.3 |
| 4,029,037 A * | 6/1977 | Hogan | | 114/127 |
| 4,031,285 A * | 6/1977 | Miller et al. | | 428/294.7 |
| 4,073,998 A * | 2/1978 | O'Connor | | 442/55 |
| 4,107,247 A * | 8/1978 | Dukess | | 264/45.9 |
| 4,287,245 A * | 9/1981 | Kikuchi | | 428/34.2 |
| 4,350,734 A * | 9/1982 | Hammond | | 428/308.4 |
| 4,361,613 A * | 11/1982 | Bogner et al. | | 428/119 |
| 4,414,265 A * | 11/1983 | Rosato et al. | | 442/55 |
| 4,585,683 A * | 4/1986 | Curnow | | 428/71 |
| 4,774,794 A * | 10/1988 | Grieb | | 52/309.7 |
| 4,903,446 A * | 2/1990 | Richards et al. | | 52/223.6 |
| 4,961,977 A * | 10/1990 | Archer et al. | | 428/36.3 |
| 5,219,513 A * | 6/1993 | Addeo et al. | | 264/510 |
| 5,333,429 A * | 8/1994 | Cretti | | 52/309.7 |
| 5,438,171 A * | 8/1995 | Schmanski | | 181/210 |
| 5,497,589 A * | 3/1996 | Porter | | 52/309.7 |
| 5,543,194 A * | 8/1996 | Rudy | | 428/69 |
| 5,624,728 A * | 4/1997 | Hoopingarner et al. | | 428/76 |
| 5,756,179 A * | 5/1998 | Jutte | | 428/69 |
| 5,789,057 A * | 8/1998 | Naitou et al. | | 428/73 |
| 5,798,160 A * | 8/1998 | Kohn | | 428/56 |
| 5,834,082 A * | 11/1998 | Day | | 428/56 |
| 5,851,609 A * | 12/1998 | Baratuci et al. | | 428/34 |
| 5,893,248 A * | 4/1999 | Beliveau | | 52/309.7 |
| D409,869 S * | 5/1999 | Marusak | | D6/577 |
| 5,979,684 A * | 11/1999 | Ohnishi et al. | | 220/1.5 |
| 6,085,485 A * | 7/2000 | Murdock | | 52/783.19 |
| 6,096,416 A * | 8/2000 | Altenberg | | 428/317.7 |
| 6,138,580 A * | 10/2000 | Thoman | | 105/396 |
| 6,148,586 A * | 11/2000 | Jandl | | 52/783.17 |
| 6,158,190 A * | 12/2000 | Seng | | 52/841 |
| 6,205,728 B1* | 3/2001 | Sutelan | | 52/309.7 |
| 6,276,104 B1* | 8/2001 | Long et al. | | 52/309.4 |
| 6,308,491 B1* | 10/2001 | Porter | | 52/794.1 |
| 6,406,078 B1* | 6/2002 | Wycech | | 293/120 |
| 6,408,594 B1* | 6/2002 | Porter | | 52/794.1 |
| D462,458 S * | 9/2002 | Hughes et al. | | D25/122 |
| 6,484,463 B1* | 11/2002 | Fay | | 52/404.4 |
| 6,494,012 B2* | 12/2002 | Seng | | 52/841 |
| 6,824,851 B1* | 11/2004 | Locher et al. | | 428/76 |
| 6,860,082 B1* | 3/2005 | Yamamoto et al. | | 52/794.1 |
| 6,871,600 B2* | 3/2005 | Norton et al. | | 105/404 |
| 6,875,484 B1* | 4/2005 | Kogure et al. | | 428/34.1 |
| 6,892,507 B1* | 5/2005 | Pease | | 52/794.1 |
| 6,901,711 B2* | 6/2005 | Fay et al. | | 52/407.3 |
| 6,927,183 B1* | 8/2005 | Christen | | 442/370 |
| 6,972,144 B2* | 12/2005 | Roth et al. | | 428/68 |
| 7,421,830 B1* | 9/2008 | Hughes et al. | | 52/783.1 |
| 8,318,296 B2* | 11/2012 | Turnbach et al. | | 428/304.4 |
| 8,343,610 B2* | 1/2013 | Kitano et al. | | 428/76 |
| 2001/0009703 A1 | 7/2001 | Toshikawa | | 428/35.7 |
| 2002/0069600 A1* | 6/2002 | Bryant | | 52/309.9 |
| 2002/0112428 A1* | 8/2002 | Dingler | | 52/309.16 |
| 2003/0196567 A1* | 10/2003 | Norton et al. | | 105/396 |
| 2003/0198775 A1* | 10/2003 | Roth et al. | | 428/68 |
| 2004/0068948 A1* | 4/2004 | Wrass | | 52/309.7 |
| 2004/0115420 A1* | 6/2004 | Schoemann | | 428/317.9 |
| 2004/0241392 A1* | 12/2004 | Sorrentino | | 428/151 |
| 2005/0287347 A1* | 12/2005 | Sorrentino | | 428/304.4 |
| 2006/0003155 A1* | 1/2006 | Stewart | | 428/304.4 |
| 2008/0038505 A1* | 2/2008 | Salzmann | | 428/71 |
| 2008/0261016 A1* | 10/2008 | Tamada et al. | | 428/314.2 |
| 2010/0266833 A1* | 10/2010 | Day et al. | | 428/304.4 |
| 2011/0244213 A1* | 10/2011 | Jones | | 428/304.4 |
| 2012/0104110 A1* | 5/2012 | Roberts, Jr. | | 238/84 |

* cited by examiner

RESIN PANEL AND METHOD OF PRODUCING THE SAME

TECHNICAL FIELD

The present invention relates to a resin panel used for interior articles for automobiles such as cargo floor panels (lid panels or luggage boards of automobile load chambers) and rear parcel shelves or panel-like construction articles such as interior wall partitions and doors, and a method of manufacturing the same.

BACKGROUND ART

In interior parts such as decorative articles such as parcel trays for use in vehicles such as automobiles and airplanes or decorative laminates used for indoor walls, a resin hollow molded article having arranged therein a reinforcing material such as a material, steel tube and flame, having an air layer such as an adiabatic material or acoustic material as an intermediate member of an interior part by sheet blow molding is described in Japanese Patent Application Laid-Open (JP-A) No. 10-80982. In addition, a resin hollow molded article formed by blow-molding a sheet-like parison as well as inner-packaging a foam during blow molding is described in JP-A-2000-218682.
Patent Document 1: JP-A-10-80982
Patent Document 2: JP-A-2000-218682

SUMMARY OF THE INVENTION

In a resin molded article described in Japanese Publication JP 10-080982, during its blow molding, an intermediate member such as a foam or reinforcing material is inserted. In addition, a resin hollow molded article described in Japanese Publication JP 2000-216682 also have been inserted thereinto a foam molded in advance during blow molding and when a reinforcing material is inner packaged, processing of inserting a reinforcing material after molding is needed.

Thus, intermediate members inner packaged in a resin hollow molded article are in a plurality of numbers, the configuration and positioning of the intermediate members between molds are not easy, so that that molding precision is lowered and rattling movement is caused due not to obtain a filled state of the intermediate members. Also, for an intermediate member like a metal reinforcing material in which shrinkage is not generated, problems of a distortion due to molding shrinkage of a resin hollow molded article being enlarged are pointed out.

Therefore, an object of one embodiment the present invention is to provide a resin panel produced such that the positioning of a reinforcing material can be precisely done, rattling movement is prevented and distortion by molding shrinkage is not caused because a foam is inner-packaged within the hollow part to weld the foam on the inner wall faces of the front and back walls of a resin panel, the foam being made of a thermoplastic resin that is formed in advance in substantially the same shape as the shape of the space of the inside of the hollow part, and also an accommodation part for accommodating the reinforcing material is formed in the foam, so that a plurality of members like the foam and the reinforcing materials can be arranged between molds at a time to thereby make a molding step easy and maintain the reinforcing materials in the foam, and a method of manufacturing the resin panel.

A resin panel according to one embodiment of the present invention for achievement of the above object is a resin panel having a hollow double-wall structure including front and back walls and a peripheral wall joining the front and back walls together, characterized in that the peripheral wall of the resin panel has a welded part on its entire periphery, within the hollow part a foam made of a thermoplastic resin that is molded in advance in substantially the same shape as the shape of the space within the hollow part is inner packaged, and also the foam is welded on the inner wall faces of the front and back walls of the resin panel, and an accommodation part for accommodating a reinforcing material is formed in the foam.

The resin panel according to another embodiment of the present invention is characterized in that, in the resin panel of claim 1, the reinforcing material is lengthwise and the foam intervenes between at least one end of the reinforcing materials and the peripheral wall.

The resin panel according to a further embodiment of the present invention is characterized in that, in the resin panel of claim 1, the reinforcing material is lengthwise and the resin panel has a cavity part without the foam between at least one end of the reinforcing materials and the peripheral wall.

The resin panel according to still another embodiment of the present invention is characterized in that, in the resin panel the accommodation part formed in the foam is a concave part that is dented from one face to the other face of the foam.

The resin panel according to a still further embodiment of the present invention is characterized in that, in the resin panel, the accommodation part formed in the foam is a penetration hole that passes through from one face to the other face of the foam.

A method of manufacturing a resin panel according to yet another embodiment of the present invention is characterized, in the method of manufacturing the resin panel inner-packaging a foam and reinforcing material, by arranging a parison or resin sheet in a melt state between separation molds, press molding the parison or resin sheet in a mold cavity by vacuum or air pressure, maintaining the reinforcing material in an accommodation part of the foam molded in advance, and then arranging the foam in the cavity and subjecting it to mold closing to weld the inner face of the parison or resin sheet in a melt state and the outer face of the foam.

DETAILED DESCRIPTION

According to one embodiment of the present invention, there can be obtained a resin panel in which the positioning of a reinforcing material can be precisely done, rattling movement is prevented and distortion by molding shrinkage is not caused because a foam is inner-packaged within the hollow part to weld the foam on the inner wall faces of the front and back walls of a resin panel, the foam being made of a thermoplastic resin that is formed in advance in the substantially the same shape as the shape of the space within the hollow part, and also an accommodation part for accommodating the reinforcing material is formed in the foam. Consequently, a plurality of members like the foam and the reinforcing materials can be arranged between molds at a time to thereby make a molding step easy and maintain the reinforcing materials in the foam.

Figure 1:
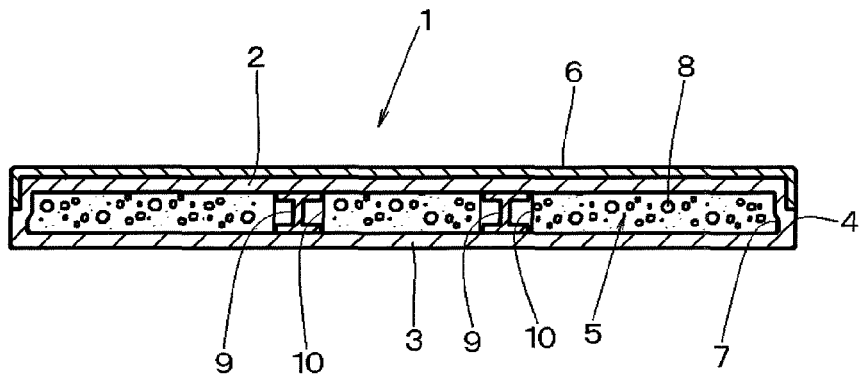
FIG. 1 is a cross-sectional view of a resin panel according to the present invention.
Figure 2:
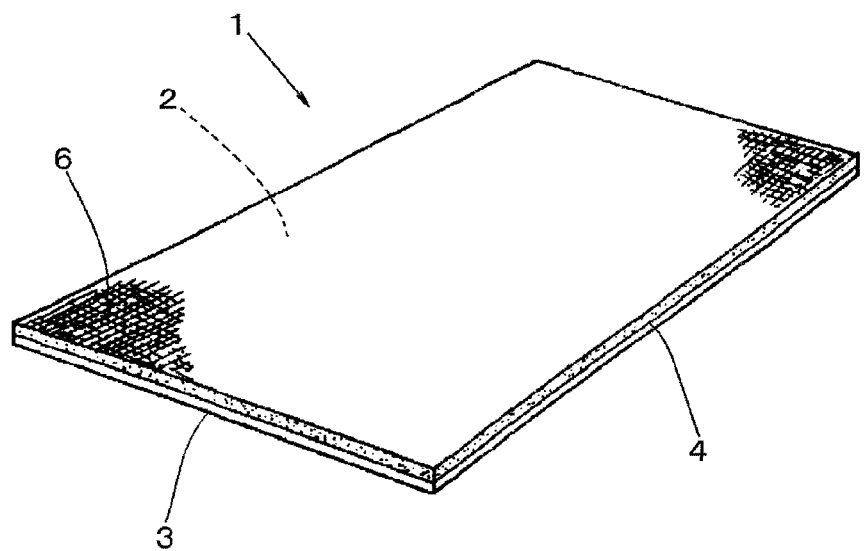
FIG. 2 is an entire perspective view of the resin panel.
Figure 3:
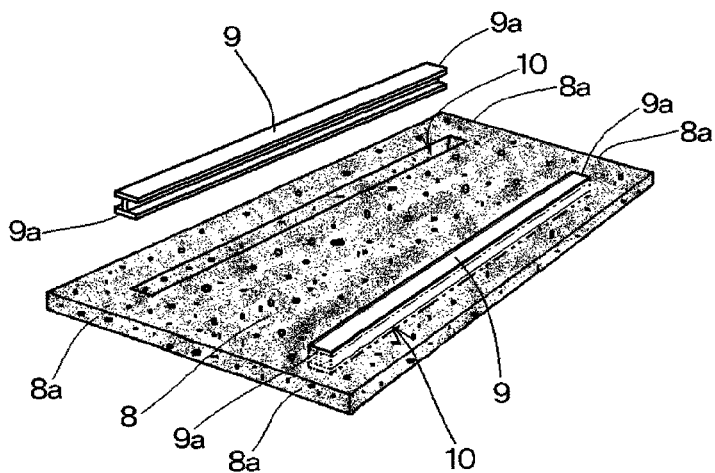
FIG. 3 is a perspective view indicating an aspect of locating reinforcing materials in a foam comprised of thermoplastic resin preliminary molded.
Figure 4:
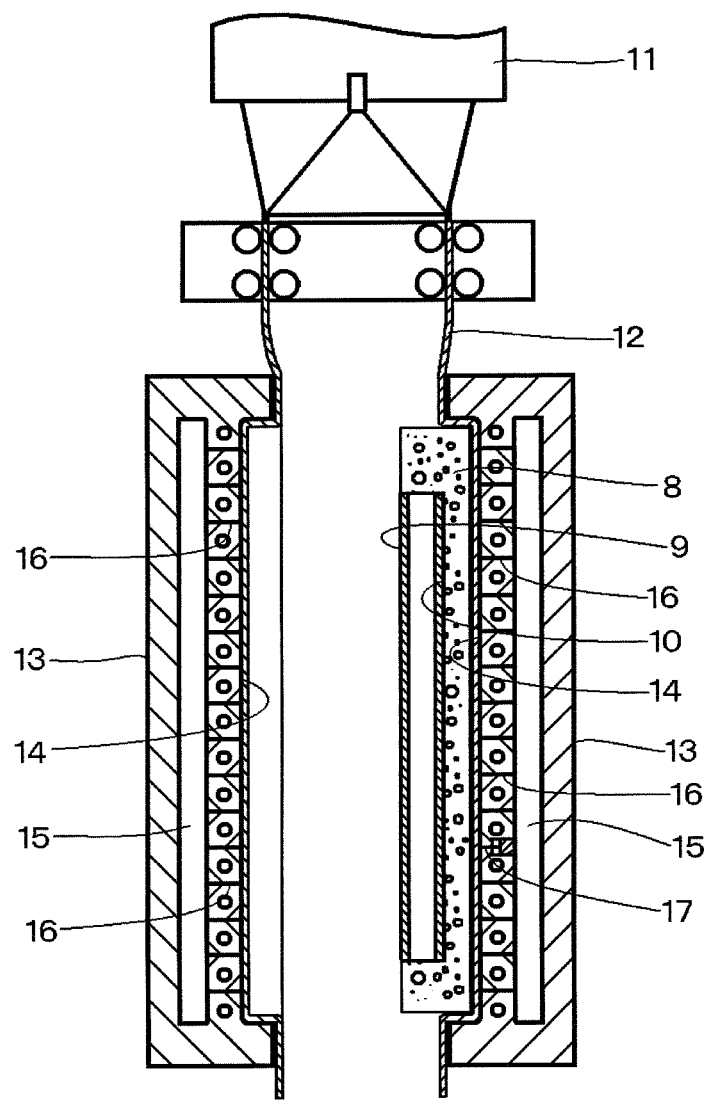
FIG. 4 is a cross-sectional view indicating an aspect of blow molding that inner packages a foam having reinforcing material within a resin panel.

FIG. 1 is a cross-sectional view of a resin panel according to one embodiment of the present invention. FIG. 2 is an entire perspective view of the resin pane. FIG. 3 is a perspective view indicating an aspect of arranging a reinforcing material in a foam comprised of a thermoplastic resin that is formed in advance. FIG. 4 is a cross-sectional view indicating an aspect of blow molding that inner packages a foam having a reinforcing material arranged therein in a resin panel.

A resin panel 1 according to one embodiment of the present invention includes, as shown in FIGS. 1 and 2, a front wall 2, a back wall 3 and a peripheral wall 4 jointing the front wall 2 and back wall 3, and has a hollow double-wall structure. Reference numeral 5 denotes a hollow part. To the surface of the front wall 2 is stuck a skin material 6 for decoration and the like to the peripheral wall.

The peripheral wall 4 of the resin panel 1 has a welded part 7 in its entire periphery and in its hollow part 5 is inner packaged a foam 8. The foam 8 is made of a thermoplastic resin formed in advance in the substantially the same shape as the shape of the space of the inside of the hollow part 5 and has formed therein accommodation parts 10, 10 for accommodating reinforced materials 9, 9. In the accommodation parts 10, 10 are arranged reinforced materials 9, 9. The foam 8 is welded on the inner faces of the front wall 2 and back wall 3 of the resin panel 1. Because of this, the reinforcing materials 9, can be surely held in the foam 8 to precisely position the reinforcing materials 9, 9 and also can prevent the rattling movement of the foam 8 and reinforcing materials 9, 9 inner-packaged in the hollow part 5.

The reinforcing materials 9, 9 are lengthwise and made of metal or hard plastics having shapes such as a columnar pipe, angular pipe or H steel. The reinforcing materials 9, 9 are inserted and arranged, as shown in FIG. 3, in the accommodation parts 10, 10 of the foam 8. The foam 8 intervenes between the ends 9a, 9a (may be at least one of the ends) of both of the reinforcing materials 9, 9 and the peripheral wall 4. Reference numerals 8a, 8a are intervention parts.

In this manner, the foam 8 is made to intervene between the ends 9a, 9a of both of the reinforcing materials 9, 9 and the peripheral wall 4. Accordingly, a portion of molding shrinkage is absorbed by the intervention parts 8a, 8a of the foam to enable obtaining the resin panel 1 that does not cause distortion due to shrinkage difference of the resin panel 1 and reinforcing materials 9, 9.

In addition, an aspect is possible in which a cavity part without the intervention by the foam 8 is formed between at least one end of the reinforcing materials 9, 9 and the peripheral wall 4 (not shown). The accommodation parts 10, 10 formed in the foam 8 each are, as shown in FIG. 3, a concave part dented from one face to the other face of the foam 8, and may be a penetration hole that passes through from one face to the other face of the foam 8 (not shown).

The resin panel 1 inner packaging the foam 8 and reinforcing materials 9, 9 is blow molded by means of the aspect indicated in FIG. 4. In other words, a parison 12 extruded from a resin extrusion head 11 is located in a melt state between separation molds 13, 13, and the parison 12 is press-molded in cavities 14, 14 of the mold by vacuum or air pressure. Then, the foam 8, that is molded in advance and held in the accommodation parts 10, 10 with insertion of the reinforcing materials 9, 9, is subjected to mold closing in such a way that the foam is made in contact with the inner face of the sheet-like parison 12 in one cavity 14. Subsequently, the parison 12 arranged in the respective cavities 14, 14 is inserted in such a manner that the welded part 7 is formed on the entire periphery of the peripheral wall 4 of the resin panel 1 by means of a pinch-off part of the separation molds 13, 13, while welding the inner face of the parison 12 in a melt state and the outer face of the foam 8. This makes it possible to obtain the resin panel 1 in which the foam 8 having arranged therein the reinforcing materials 9, 9 is inner-packaged in the hollow part 5. Additionally, the resin panel 1 can be formed by an aspect of blow molding a pair of resin sheets preliminary molded (not shown). In FIG. 4, reference numeral 15 denotes a vacuum chamber, reference numeral 16 denotes an aeration contact face, and reference numeral 17 denotes a blow pin.

Blow molding in various embodiments of the present invention refers to a so-called direct blow molding, sheet blow molding or the like, involving melt extruding a tubular parison or a plurality of resin sheets or overheat melting a resin sheet preliminary molded as well as locating the material in between the separation molds and carrying out mold closing to mold the resulting material in a desired shape. Accompanying air blowing or not does not matter.

A thermoplastic resin constituting the front wall 2, back wall 3 and the peripheral wall 4 of the resin panel 1 may be acceptable if blow molding is possible, and suitable examples thereof include engineering plastics such as polyethylene resin, polypropylene resin, ethylene-vinyl acetate copolymer, vinyl chloride resin, ABS resin (acrylonitrile-styrene-butadiene resin), polyamide resin, polystyrene resin, polyester resin, polycarbonate resin and modified polyphenylene ether. As appropriate, a filler such as a glass fiber, carbon fiber, calcium carbonate, talc, or mica can be added thereto.

The foam 8 is made of polyethylene, polypropylene, polystyrene, or the like, and is desirably the same material as thermoplastic resin constituting panels of the front, back and peripheral walls. In addition, to the foam can be added a filler such as a glass fiber, carbon fiber, calcium carbonate, talc, or mica.

The skin material 6 can be as appropriate selected from a knitted article, fabric and unwoven cloth obtained by processing fiber composed of a natural fiber, regenerated fiber, semi-synthetic fiber, synthetic fiber and a blend thereof, or a resin sheet composed of a thermoplastic resin such as polyvinyl chloride (PVC), thermoplastic elastomer (TPE) such as thermoplastic polyurethane elastomer (TPU) or thermoplastic polyolefin elastomer (TPO), and polyethylene polyolefin resin, and laminated sheet thereof.

DESCRIPTION OF REFERENCE NUMERALS

1: Resin panel
2: Front wall
3: Back wall
4: Peripheral wall
5: Hollow part
6: Skin material
7: Welded part
8: Foam
8a, 8a: Intervention part
9, 9: Reinforcing material
9a, 9a: Ends of both
10, 10: Accommodation part
11: Resin extrusion head
12: Parison
13, 13: Separation molds
14, 14: Cavities
15: Vacuum chamber
16: Aeration contact face
17: Blow pin

The invention claimed is:

1. A resin panel for interiors of automobiles, said resin panel comprising:
   a hollow double walled structure with front and back walls, a peripheral wall joining said front and back walls
   said front, back, and peripheral walls comprising thermoplastic resin;
   a pre molded foam member having an accommodation part configured to hold a metal reinforcing member said reinforcing member having an "H" cross section, said accommodation part comprising a void in said pre molded foam member said pre molded foam member comprising thermoplastic resin and disposed within said hollow double walled structure such that said void is open to an interior of at least one wall of said hollow double walled structure;
   said reinforcing member being disposed lengthwise within said accommodation part, and being securely held within said foam member;
   said foam member being welded to inner faces of said front and back walls, and enclosed by a welded part disposed along the entire periphery of said peripheral wall, wherein said foam member intervenes between at least one end of the reinforcing member and the peripheral wall adjacent to an end of said lengthwise reinforcing member.

2. The resin panel according to claim 1, characterized in that
   the reinforcing member is lengthwise, and
   the resin panel has a cavity part disposed within the foam member, such that a portion of said foam member is disposed between at least one end of the reinforcing members and the peripheral wall adjacent to an end of said lengthwise reinforcing member.

3. The resin panel according to claim 1 characterized in that
   the accommodation part formed in the foam member is a concave part that is dented from a first face of said foam member to a second face of the foam member and configured to precisely position said reinforcing member in a desired position.

4. The resin panel according to claim 1, characterized in that
   the accommodation part formed in the foam member is a penetration hole that passes through from a first face of said foam member to a second face of the foam-member and configured to precisely position said reinforcing member in a desired position.

5. The resin panel of claim 1 wherein said void is open to interiors of both front and back walls of said hollow double wall structure.

* * * * *